US012718024B2

(12) United States Patent
Wang et al.

(10) Patent No.: US 12,718,024 B2
(45) Date of Patent: Aug. 25, 2026

(54) MODEL TRAINING METHOD AND APPARATUS, SERVICE PROCESSING METHOD AND APPARATUS, STORAGE MEDIUM, AND DEVICE

(71) Applicant: Alipay (Hangzhou) Information Technology Co., Ltd., Hangzhou (CN)

(72) Inventors: Weiqiang Wang, Hangzhou (CN); Jinzhen Lin, Hangzhou (CN); Zhenzhe Ying, Hangzhou (CN); Lanqing Xue, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 198 days.

(21) Appl. No.: 18/522,028

(22) Filed: Nov. 28, 2023

(65) Prior Publication Data

US 2024/0177510 A1 May 30, 2024

(30) Foreign Application Priority Data

Nov. 29, 2022 (CN) ......................... 202211509841.6

(51) Int. Cl.
*G06F 17/00* (2019.01)
*G06F 40/289* (2020.01)
*G06F 40/30* (2020.01)

(52) U.S. Cl.
CPC ............ *G06F 40/30* (2020.01); *G06F 40/289* (2020.01)

(58) Field of Classification Search
None
See application file for complete search history.

(56) References Cited

U.S. PATENT DOCUMENTS 10,409,913 B2 * 9/2019 Bhatt ...................... G10L 15/26
11,055,119 B1 * 7/2021 Silverstein ............... G06N 3/08
(Continued)

FOREIGN PATENT DOCUMENTS

CA 3148554 A1 * 2/2021 ............. G06N 3/045
CN 109299276 A 2/2019
(Continued)

OTHER PUBLICATIONS

Shenglan Lian, "Research on Semantic Parsing Methods of Natural Language Interaction for Service Robot," University of Science and Technology of China, Jul. 2, 2020, 77 pages.
(Continued)

*Primary Examiner* — Satwant K Singh
(74) *Attorney, Agent, or Firm* — Seed IP Law Group LLP

(57) ABSTRACT

The present specification discloses a model training method and apparatus, a service processing method and apparatus, a storage medium, and a device. The model training method includes: obtaining a historical conversation; determining a target conversation content from the historical conversation; inputting the historical conversation into a to-be-trained feature extraction model for the feature extraction model to determine a conversation content feature corresponding to the target conversation content as a first feature based on a conversation content other than the target conversation content in the historical conversation, and to determine a conversation content feature corresponding to the target conversation content as a second feature based on the target conversation content; and training the feature extraction model with an optimization goal of reducing a deviation between the first feature and the second feature, where the trained feature extraction model is used to determine an output conversation content feature corresponding to each input conversation content, and send the output conversation (Continued)

content feature for a receiving end to perform service processing based on the received output conversation content feature.

20 Claims, 5 Drawing Sheets

(56) References Cited

U.S. PATENT DOCUMENTS

| | | | | |
|---|---|---|---|---|
| 11,516,158 | B1 * | 11/2022 | Luzhnica | G06F 40/30 |
| 11,625,534 | B1 * | 4/2023 | Agarwal | G06V 30/413 704/9 |
| 11,941,366 | B2 * | 3/2024 | Shao | G06F 40/284 |
| 2013/0238986 | A1 | 9/2013 | Hattori et al. | |
| 2021/0256969 | A1 * | 8/2021 | Zhai | G06F 40/279 |
| 2022/0121844 | A1 * | 4/2022 | Lee | G06V 30/412 |
| 2022/0309088 | A1 * | 9/2022 | Ou | G06N 3/0455 |
| 2023/0186163 | A1 * | 6/2023 | Poncelas | G06N 20/00 704/2 |
| 2023/0289528 | A1 * | 9/2023 | Ma | G06F 40/289 |

FOREIGN PATENT DOCUMENTS

| | | | |
|---|---|---|---|
| CN | 113010640 | A | 6/2021 |
| CN | 113011483 | A | 6/2021 |
| CN | 114860967 | A | 8/2022 |
| CN | 115203394 | A | 10/2022 |
| CN | 115309877 | A | 11/2022 |
| CN | 116151355 | A | 5/2023 |
| CN | 116501852 | A | 7/2023 |
| CN | 117786417 | A | 3/2024 |
| CN | 119996070 | A | 5/2025 |
| JP | 2017208054 | A | 11/2017 |
| WO | 2021196981 | A1 | 10/2021 |

OTHER PUBLICATIONS

Xiaoyu Zhang et al., "M-SQL: Multi-Task Representation Learning for Single-Table Text2sql Generation," IEEE Access, Mar. 12, 2020, 12 pages.

* cited by examiner

MODEL TRAINING METHOD AND APPARATUS, SERVICE PROCESSING METHOD AND APPARATUS, STORAGE MEDIUM, AND DEVICE

TECHNICAL FIELD

The present specification relates to the field of computer technologies, and in particular, to a model training method and apparatus, a service processing method and apparatus, a storage medium, and a device.

BACKGROUND

In service scenarios such as privacy protection, risk control, and intelligent conversation, conversation contents of users usually are analyzed, and corresponding service processing is performed based on analysis results. Therefore, corresponding model algorithms are used to perform feature extraction on the conversation contents of the users, and corresponding service processing is performed based on extracted features. In addition, quality of the extracted features usually affects a final service processing result.

SUMMARY

The present specification provides a model training method and apparatus, a service processing method and apparatus, a storage medium, and a device, so that features extracted by a trained model can accurately express semantic information of a conversation content, to obtain an accurate service processing result.

The present specification provides a model training method, including: obtaining a historical conversation; determining a target conversation content from the historical conversation; inputting the historical conversation into a to-be-trained feature extraction model for the feature extraction model to determine a conversation content feature corresponding to the target conversation content as a first feature based on a conversation content other than the target conversation content in the historical conversation, and to determine a conversation content feature corresponding to the target conversation content as a second feature based on the target conversation content; and training the feature extraction model with a goal of reducing a deviation between the first feature and the second feature, where the trained feature extraction model is used to determine an output conversation content feature corresponding to each input conversation content, and send the output conversation content feature for a receiving end to perform service processing based on the received output conversation content feature.

In some implementations, before the inputting the historical conversation into the feature extraction model, the method further includes: replacing the target conversation content in the historical conversation with an identified character to obtain a replaced conversation; and the inputting the historical conversation into the to-be-trained feature extraction model for the feature extraction model to determine the conversation content feature corresponding to the target conversation content as the first feature based on the conversation content other than the target conversation content in the historical conversation includes: inputting the replaced conversation into the feature extraction model for the feature extraction model to determine a conversation content feature at a corresponding location of the identified character as the first feature based on a conversation content at a location other than the corresponding location of the identified character in the replaced conversation.

In some implementations, the determining the target conversation content from the historical conversation includes: selecting the target conversation content from the historical conversation based on a selection probability corresponding to each conversation content included in the historical conversation.

In some implementations, the determining the target conversation content from the historical conversation includes: if it is determined that at least two target conversation contents need to be determined from the historical conversation, determining target conversation contents from conversation contents that are not adjacent to each other in a word order.

In some implementations, the training the feature extraction model with the goal of reducing the deviation between the first feature and the second feature includes: determining a similarity between the first feature and the second feature; and training the feature extraction model with a goal of increasing, e.g., maximizing, the similarity.

In some implementations, before the training the feature extraction model with the goal of reducing the deviation between the first feature and the second feature, the method further includes: inputting the replaced conversation into the feature extraction model, and restoring, as a predicted conversation content, a conversation content at the corresponding location of a conversation content tag based on the conversation content at the location other than the corresponding location of the identified character in the replaced conversation; and the training the feature extraction model with the goal of reducing the deviation between the first feature and the second feature includes: training the feature extraction model with a goal of reducing the deviation between the first feature and the second feature and reducing a deviation between the predicted conversation content and the target conversation content.

The present specification provides a service processing method, including: obtaining a service conversation; inputting the service conversation into a pretrained feature extraction model for the feature extraction model to determine, for each conversation content included in the service conversation, a conversation content feature corresponding to the conversation content based on a conversation content other than the conversation content in the service conversation, where the feature extraction model is obtained through training by using the above model training method; and performing service processing based on the conversation content feature corresponding to each conversation content included in the service conversation.

The present specification provides a model training apparatus, including: an acquisition module, configured to obtain a historical conversation; a determining module, configured to determine a target conversation content from the historical conversation; an inputting module, configured to input the historical conversation into a to-be-trained feature extraction model for the feature extraction model to determine a conversation content feature corresponding to the target conversation content as a first feature based on a conversation content other than the target conversation content in the historical conversation, and to determine a conversation content feature corresponding to the target conversation content as a second feature based on the target conversation content; and a training module, configured to train the feature extraction model with a goal of reducing a deviation between the first feature and the second feature, where the trained feature extraction model is used to determine an output conversation content feature corresponding to each input conversation content, and send the output conversation content feature for a receiving end to perform service processing based on the received output conversation content feature.

The present specification provides a service processing apparatus, including: an acquisition module, configured to obtain a service conversation; an inputting module, configured to input the service conversation into a pretrained feature extraction model for the feature extraction model to determine, for each conversation content included in the service conversation, a conversation content feature corresponding to the conversation content based on a conversation content other than the conversation content in the service conversation, where the feature extraction model is obtained through training by using the above model training method; and a processing module, configured to perform service processing based on the conversation content feature corresponding to each conversation content included in the service conversation.

The present specification provides a computer-readable storage medium, where the storage medium stores a computer program, and when the computer program is executed by a processor, the model training method described above is implemented.

The present specification provides an electronic device, including a memory, a processor, and a computer program that is stored in the memory and that can run on the processor. The processor implements the above model training method when executing the program.

At least one of the above technical solutions used in the present specification can achieve the following beneficial effects:

In the model training method provided in the present specification, the target conversation content can be determined from the obtained historical conversation, and the historical conversation can be input into the to-be-trained feature extraction model for the feature extraction model to determine the first feature corresponding to the target conversation content based on the conversation content other than the target conversation content in the historical conversation, and to determine the second feature corresponding to the target conversation content based on the target conversation content. Further, the feature extraction model is trained with the goal of reducing the deviation between the first feature and the second feature, where the trained feature extraction model is used to determine the output conversation content feature corresponding to each input conversation content, and send the output conversation content feature for a receiving end to perform service processing based on the received output conversation content feature.

It can be appreciated from the above method that, in this solution, when the conversation content feature corresponding to the conversation content is determined, the first feature corresponding to the conversation content can be determined based on a conversation content other than the conversation content in the historical conversation, and the feature extraction model is further trained with the goal of reducing the deviation between the first feature and the determined second feature corresponding to the target conversation content. As such, the determined conversation content feature of each conversation content is determined based on context information of the conversation content, so that semantic information of each conversation content can be accurately expressed. In addition, even if two conversation contents have different texts, conversation content features corresponding to the conversation contents are the same or similar as long as context of the conversation contents are similar or meanings of the conversation contents are almost the same. Therefore, after service processing is performed based on the conversation content feature obtained in the above method, a more accurate service processing result can be obtained.

BRIEF DESCRIPTION OF DRAWINGS

The accompanying drawings described herein are used to provide further understanding of the specification and constitute a part of the specification. The example implementations of the specification and descriptions of the implementations are used to explain the specification, and do not constitute an undue limitation on the specification. In the accompanying drawings.

DESCRIPTION OF EMBODIMENTS

To make the characteristics, technical solutions, and technical benefits of the specification clearer, the following clearly and completely describes the technical solutions in the specification with reference to specific implementations of the specification and corresponding accompanying drawings. Clearly, the described implementations are merely some examples rather than all of implementations of the present specification. All other implementations obtained by a person of ordinary skill in the art based on the example implementations of the present specification without making innovative efforts fall within the protection scope of the present specification.

Currently, when feature extraction is performed on a conversation content, words or phrases in the conversation content are usually split to determine a feature corresponding to each word or phrase, and then an average value is obtained for the features of these words or phrases, and the average value is used as a feature of the entire conversation content.

The following describes in detail the technical solutions provided in some example implementations of the present specification with reference to the accompanying drawings.

Figure 1:
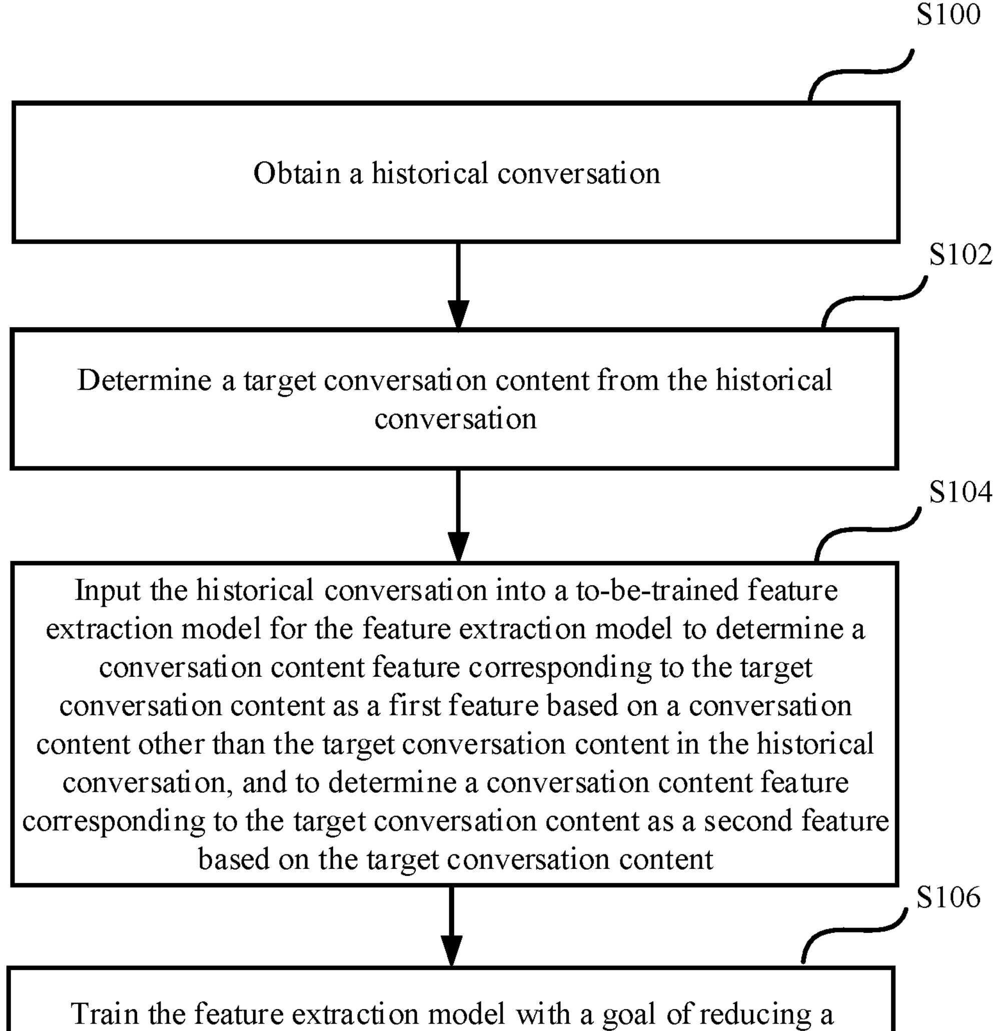
FIG. 1 is a schematic flowchart illustrating a model training method according to the present specification.

FIG. 1 is a schematic flowchart illustrating a model training method according to the present specification, and the method includes the following steps.

S100: Obtain a historical conversation.

In service scenarios such as privacy protection, risk control, and intelligent conversation, conversation data generated by a user usually is input into a corresponding model to perform feature extraction on conversation contents in the conversation data, so as to perform data analysis on the conversation data of the user based on extracted conversation content features, and then perform corresponding service processing.

For example, in a risk control service scenario, conversations of a plurality of users are usually monitored. In this case, conversation contents of these users are input into a corresponding feature extraction model to extract conversation content features corresponding to these conversation contents, and then data analysis is performed based on the extracted conversation content features. Once some target conversations appear in these conversation contents, it can be determined, based on conversation content features corresponding to these target conversations, that these users possibly perform some abnormal services, and in this case, account numbers of these users can be frozen or service processing such as giving an alarm can be performed.

For another example, in intelligent conversation scenarios such as an intelligent customer service and a conversation with a robot, feature extraction usually is performed on conversation content of a user, so as to perform analysis based on extracted conversation content features to determine a conversation intention of the user, and then answer the user based on the conversation intention of the user.

In the above service scenarios, whether a conversation content feature extracted by the feature extraction model can accurately reflect semantic information of a conversation content determines whether a processing result obtained based on the conversation content feature is accurate, and a feature extraction model training method plays a crucial role in quality of the extracted conversation content feature.

Based on this, the present specification provides a model training method, to train the feature extraction model in the above service scenarios, so that a model obtained after training can accurately reflect semantic information of a conversation content, and conversation content features corresponding to different conversation contents with a similar semantic meaning is also relatively similar. Training samples are obtained. The training samples can be historical conversations, and these historical conversations can be historical conversations between different users, or certainly can be historical conversations between a user and a server. A form of the historical conversation can be a voice conversation, a text conversation, etc., which is not specifically limited in the present specification.

In addition, in the present specification, an execution body for performing the model training method can be an identified device such as a server disposed on a service platform. For ease of description, in the present specification, only an example in which the server is the execution body is used to describe the model training method provided in the present specification.

S102: Determine a target conversation content from the historical conversation.

After the historical conversation is obtained, the server can select the target conversation content from the historical conversations. For example, in a process of training the feature extraction model in the present specification, a first feature corresponding to the target conversation content is predicted based on context information of the target conversation content. If a large number of target conversation contents are selected and locations of these target conversation contents are adjacent, it is difficult to predict the first feature corresponding to the target conversation content based on the context information of the target conversation content. The first feature corresponding to the target conversation content is described in detail below, and details are not described herein.

Therefore, the server can select the target conversation content from the historical conversation based on a selection probability corresponding to each conversation content included in the historical conversation. In addition, when it is determined that at least two target conversation contents are to be determined from the historical conversation, the target conversation contents are determined from conversation contents that are not adjacent to each other in a word order, so that the determined target conversation contents are not adjacent to each other.

For example, the server can select, from the historical conversation as target conversation contents, conversation contents that are of 15% of a total number of conversation contents included in the historical conversation and that are not adjacent to each other. Further, the server can also set a selection probability of 15% for each conversation content included in each historical conversation, and after one conversation content is selected as the target conversation content, another conversation content adjacent to the target conversation content cannot be selected as the target conversation content.

In the present specification, the feature extraction model can be a BERT model, and certainly can be another model, which is not specifically limited in the present specification.

In addition, the server can further determine a corresponding conversation content sequence based on a sequence of time corresponding to the conversation contents included in the historical conversation. In other words, the server can concatenate these conversation contents in a conversation sequence, and determine the corresponding conversation content sequence.

For example, when the historical conversations are conversation contents generated between two users in a form of a question and answer, the server can construct a conversation content sequence corresponding to these historical conversations based on a sequence of questions and answers in conversations between the two users.

In the process of constructing the conversation content sequence, the server can determine a user tag corresponding to each user, and add a user tag of a user corresponding to each historical conversation in the above conversation content sequence before the historical conversation. As such, the users corresponding to the historical conversations can be identified and distinguished. It should be noted that different users correspond to different user tags.

In the present specification, the server can first determine the conversation content sequence corresponding to the historical conversations, and then select, from the conversation content sequence, a conversation content to be extracted as a target conversation content. Certainly, the server can also first select, from the historical conversations, a target conversation content to be extracted, and then construct the conversation content sequence based on the historical conversations.

S104: Input the historical conversation into a to-be-trained feature extraction model for the feature extraction model to determine a conversation content feature corresponding to the target conversation content as a first feature based on a conversation content other than the target conversation content in the historical conversation, and to determine a conversation content feature corresponding to the target conversation content as a second feature based on the target conversation content.

After determining the target conversation content in the historical conversation and the conversation content sequence, the server can input the conversation content sequence into the to-be-trained feature extraction model for the feature extraction model to determine the conversation content feature corresponding to the target conversation content as the first feature based on a conversation content other than the target conversation content in the conversation content sequence.

In some implementations, the server can directly input the historical conversation into the to-be-trained feature extraction model for the feature extraction model to determine the first feature corresponding to the target conversation content based on the conversation content other than the target conversation content in the historical conversation.

For example, in the above historical conversation, the server can replace the target conversation content with an identified character, e.g., a symbol or a tag, to represent that a corresponding conversation content exists at the location. It should be noted that the identified symbol is merely used to represent that a conversation content exists at a corresponding location in the historical conversation, but is not used to represent any specific content of the conversation content. For example, for two completely different conversation content sequences, if only one target conversation content exists in each conversation content sequence, identified symbols corresponding to the two target conversation contents can be the same. For a plurality of corresponding target conversation contents in one conversation content sequence, to distinguish between these target conversation contents, tags corresponding to these target conversation contents can be different.

As such, the server can obtain a replaced conversation in which the target conversation content is replaced with the identified symbol, and then the server can input the replaced conversation into the to-be-trained feature extraction model, so as to predict a feature at the location of the identified symbol by using the feature extraction model. A dimension corresponding to the predicted feature can be 1*768, and the server can input the feature with the dimension of 1*768 to a corresponding linear layer for linear processing, so as to obtain a feature with the dimension of 1*768 output by the linear layer as the first feature.

In addition, the server can separately input replaced target conversation content into the feature extraction model to determine the feature with the dimension of 1*768 dimension corresponding to the target conversation content, and then input the feature with the dimension of 1*768 into another linear layer for linear processing to determine the conversation content feature corresponding to the target conversation content as the second feature.

Certainly, the first feature and the second feature can be features with other feature dimensions, which are not specifically limited in the present specification.

In addition, before inputting the target conversation content into the feature extraction model, the server can set a corresponding second identified symbol, such as a [CLS] symbol, before the target conversation content, so that a feature at a corresponding location of the second identified symbol is used as the second feature corresponding to the target conversation content, and semantic information of words or phrases in the conversation content are fused more “fairly” by using the identified tag.

In addition, when the historical conversation is input into the to-be-trained feature extraction model in a form of a conversation content sequence, the feature extraction model can first set the target conversation content in the sequence as an identified symbol, so that a replaced sequence including the identified symbol is input into the feature extraction model, to predict the first feature corresponding to the target conversation content by using a conversation content at a location other than a corresponding location of the identified symbol in the conversation content sequence.

It should be noted that in the present specification, the server can separately input the replaced conversation and the target conversation content into the feature extraction model to separately determine the first feature and the second feature. For example, the server can first input the replaced conversation to determine the first feature, and then input the target conversation content to determine the second feature. Also, the server can first input the target conversation content, and then input the replaced conversation.

The server can alternatively input only the historical conversation into the feature extraction model for the feature extraction model to directly determine the first feature corresponding to the target conversation content based on the conversation content other than the target conversation content, and to determine the second feature corresponding to the target conversation content based on the target conversation content.

S106: Train the feature extraction model with a training goal of reducing, e.g., minimizing, a deviation between the first feature and the second feature, where the trained feature extraction model is used to determine an output conversation content feature corresponding to each input conversation content, and send the output conversation content feature for a receiving end to perform service processing based on the received output conversation content feature.

After determining the first feature and the second feature, the server can train the feature extraction model with the training goal of reducing, e.g., minimizing, the deviation between the second feature and the first feature, so that the conversation content feature corresponding to each conversation content can be closer to a conversation content feature determined based on context information of the conversation content. As such, even if two conversation contents have different context, conversation content features corresponding to the two conversation contents are almost the same as long as the two conversation contents express same semantic information or the two conversation contents have similar context information.

For example, conversation contents may be as follows: User A: Have you got a meal yet? User B: No. User A: Me neither. The conversation content “No” corresponding to user B expresses negative semantic information, and the model can also predict, based on the conversation content of user A, a conversation content feature corresponding to a conversation content to be responded by user B. Semantic information expressed by conversation contents such as “I haven’t got a meal yet”, “Not yet”, and “I haven’t got a meal” are close to or even the same as “No”, so that conversation content features corresponding to these conversation contents are also be close to “No”.

For example, the server can determine a similarity between the second feature and the first feature, and train the model with a training goal of increasing, e.g., maximizing, the similarity between the second feature and the first feature.

For example, the server can perform an inner product operation between the second feature and the first feature to obtain an inner product between the second feature and the first feature, and then divide the inner product by a square root of a feature dimension to obtain an inner product between the second feature and the first feature in a unit dimension, and represent the similarity between the second feature and the first feature by using the inner product.

In addition, the server can further select, from a conversation content library, an identified number of conversation contents other than the target conversation content as reference conversation contents; determine, for each reference conversation content, a similarity between a conversation content feature corresponding to the reference conversation content and the first feature as a reference similarity; and further determine, based on the similarities between the conversation content features corresponding to the reference conversation contents and the first feature, a probability corresponding to the similarity between the second feature and the first feature as a target probability. For example, the server inputs the reference similarities between the conversation content features corresponding to the reference conversation contents and the first feature and the similarity between the second feature and the first feature into a corresponding softmax network to determine a corresponding probability. The feature extraction model can be trained with a training goal of increasing, e.g., maximizing, the target probability. Therefore, a conversation content feature corresponding to each conversation content in the model can be further closer to a conversation content feature determined based on context information of the conversation content.

In some implementations, the server can input the replaced conversation into the feature extraction model, and restore, as a predicted conversation content, a conversation content at the corresponding location of a conversation content tag based on the conversation content at the location other than the corresponding location of the identified character in the replaced conversation. The feature extraction model can be trained with a training goal of reducing, e.g., minimizing, the deviation between the first feature and the second feature and, reducing, e.g., minimizing, a deviation between the predicted conversation content and the target conversation content.

Figure 2:
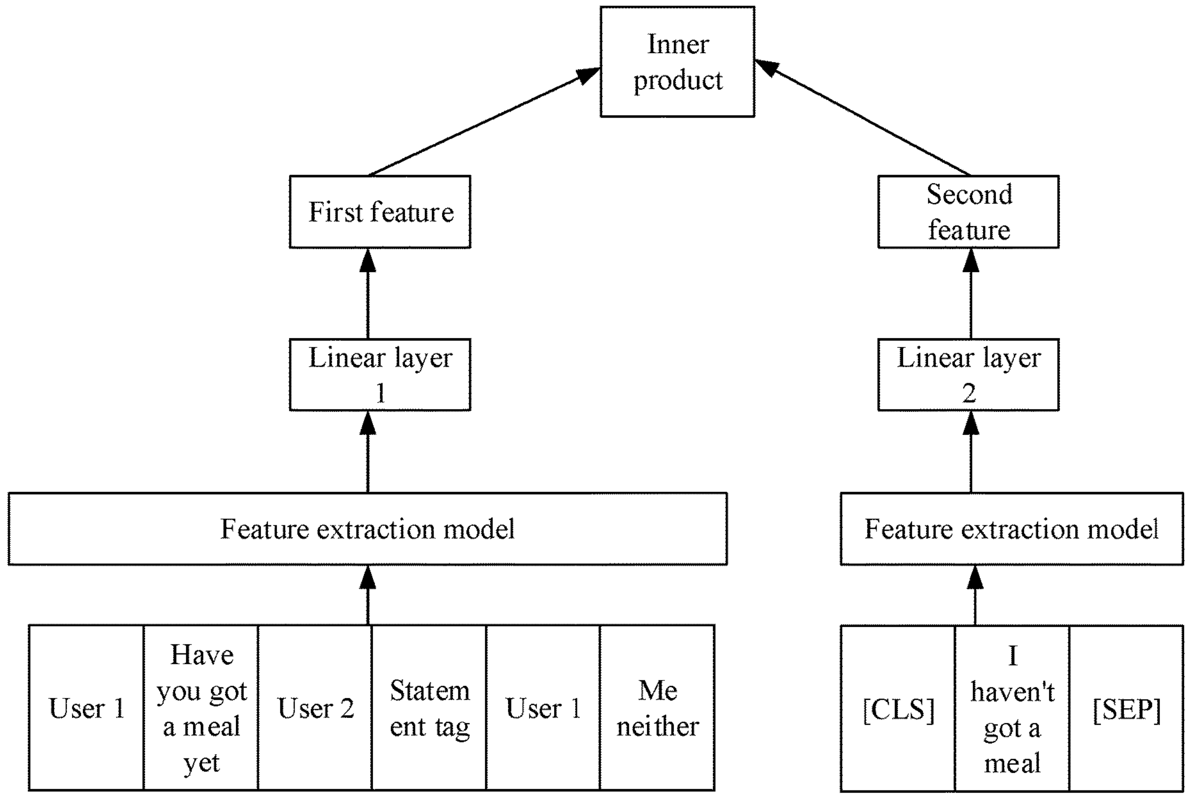
FIG. 2 is a schematic diagram illustrating a model training process according to the present specification.

For ease of understanding, the present specification further provides a schematic diagram illustrating a model training process, as shown in FIG. 2.

FIG. 2 is a schematic diagram illustrating a model training process according to the present specification.

Example conversation contents as follows are used for illustration: User 1: Have you got a meal yet? User 2: I haven't got a meal. User 1: Me neither. In this case, the server can connect the conversation contents to corresponding user tags in a conversation sequence, so as to obtain a conversation content sequence, and replace the conversation content "I haven't got a meal" of user 2 with an identified symbol in the conversation content sequence to indicate that a conversation content exists herein, so as to obtain a replaced conversation content sequence. Then, the server can input the replaced conversation content sequence into the corresponding feature extraction model to extract a feature vector, and then input the feature vector into linear layer 1 for corresponding linear processing to obtain the determined first feature.

In addition, the server can also input the conversation content "I haven't got a meal" of user 2 into the feature extraction model. Before inputting the conversation content, the server can add a corresponding [CLS] tag before the target conversation content "I haven't got a meal", and add a corresponding [SEP] tag after the target conversation content, to segment the target conversation content from other conversation contents. After inputting the target conversation content into the model, the server can extract a feature at a corresponding location of the [CLS] tag, input the feature into linear layer 2 to perform linear processing on the feature, and use a processed feature as the second feature.

After determining the first feature and the second feature, the server can perform an inner product operation between the first feature and the second feature to determine an inner product between the first feature and the second feature. A corresponding loss value of a loss function can be determined based on the inner product, and train the feature extraction model with the goal of reducing the deviation between the first feature and the second feature.

In the present specification, characteristics of training the feature extraction model include: the feature extraction model is converged into a predetermined threshold range, or a predetermined training quantity is reached, which ensures that a conversation content feature extracted by the feature extraction model can accurately express semantic information of the conversation content, and conversation content features corresponding to conversation contents with similar semantic information are also similar. Therefore, service processing can be performed based on the extracted conversation content features. The predetermined threshold and the predetermined training quantity can be set based on an actual requirement, and are not specifically limited in the present specification.

In the present specification, the trained feature extraction model is used to determine the output conversation content feature corresponding to each input conversation content, and send the output conversation content feature for the receiving end to perform service processing based on the received output conversation content feature.

The receiving end can be a lower-layer program, model, etc. of the feature extraction model, or certainly can be a corresponding device, which is not specifically limited in the present specification.

Figure 3:
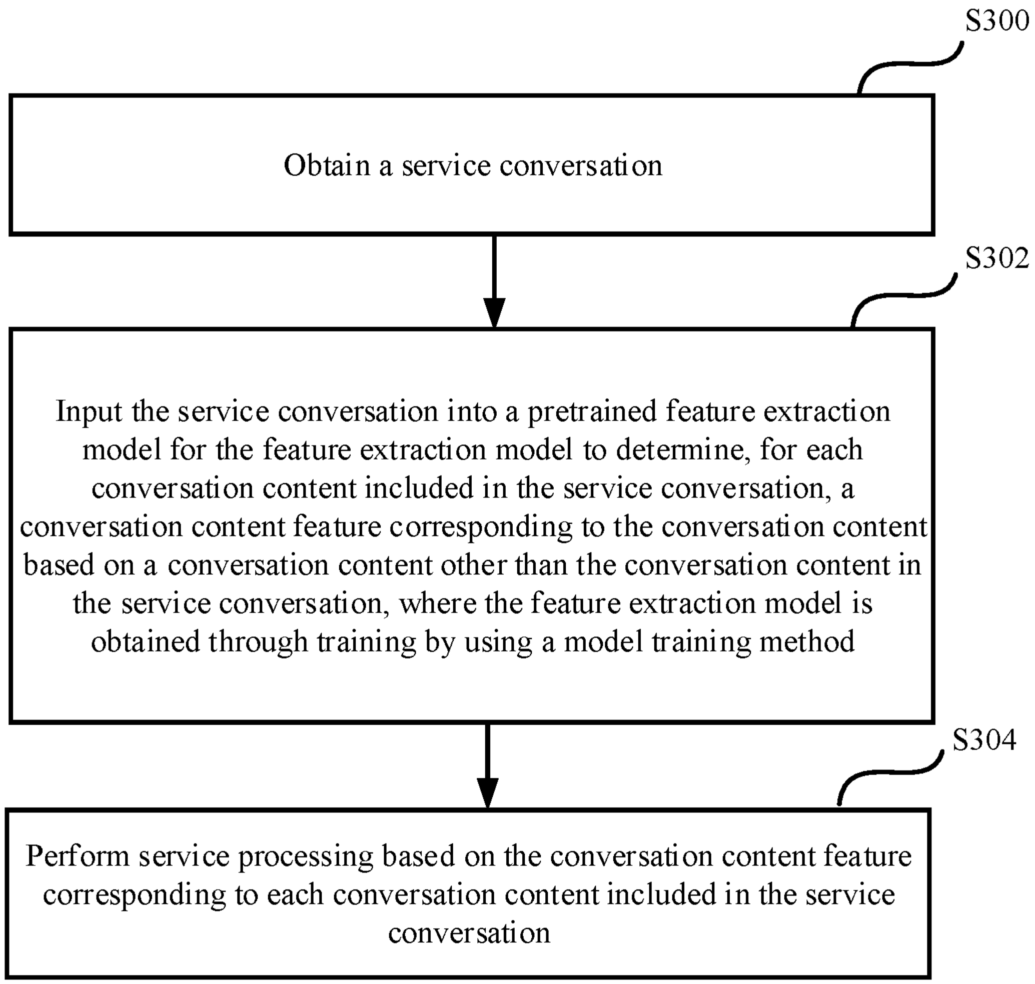
FIG. 3 is a schematic diagram illustrating a service processing method according to the present specification.

A training method for training the feature extraction model is described above, and a service processing method for performing service processing by using the feature extraction model is described below from a perspective of actual application, as shown in FIG. 3.

FIG. 3 is a schematic diagram illustrating a service processing method according to the present specification.

S300: Obtain a service conversation.

In some implementations, the server can first obtain a service conversation of a user. The service conversation can be a service conversation between different users, or certainly can be a service conversation input by a user into a corresponding device or client.

In addition, in the present specification, the service processing method can be implemented by a server disposed in a service platform, or certainly can be implemented by a service client disposed in a device such as a mobile phone, a tablet computer, a notebook computer, or a desktop computer. For ease of description, the service processing method provided in the present specification is described by using only an example in which the execution subject is a server.

S302: Input the service conversation into a pretrained feature extraction model for the feature extraction model to determine, for each conversation content included in the service conversation, a conversation content feature corresponding to the conversation content based on a conversation content other than the conversation content in the service conversation, where the feature extraction model is obtained through training by using the above model training method.

After obtaining the service conversation, the server can input the service conversation into the pretrained feature extraction model for the feature extraction model to determine, for each conversation content included in the service conversation, a conversation content feature corresponding to the conversation content based on a conversation content other than the conversation content in the service conversation, and the determined conversation content feature clearly expresses semantic information of the conversation.

Certainly, for each conversation content, the server can also combine a conversation content feature corresponding to the conversation content determined based on a conversation content other than the conversation content in the service conversation with a conversation content feature determined based on only the conversation content, and a combined feature is used as a final feature of the conversation content.

S304: Perform service processing based on the conversation content feature corresponding to each conversation content included in the service conversation.

Then, the server can perform service processing based on the conversation content feature corresponding to each conversation content included in the service conversation. In different service scenarios, obtained service processing results can be different. For example, in an intelligent conversation scenario, the service processing can be making a corresponding reply based on a conversation content input by a user, and in a service scenario such as risk control, the service processing can be performing processing such as account freezing or alarming when it is detected that a conversation between users is abnormal.

It can be learned from the above method that, in this solution, when the conversation content feature corresponding to the conversation content is determined, the first feature corresponding to the conversation content can be determined based on a conversation content other than the conversation content in the historical conversation, and the feature extraction model is further trained with the goal of reducing the deviation between the first feature and the determined second feature corresponding to the target conversation content. As such, the determined conversation content feature of each conversation content is determined based on context information of the conversation content, so that semantic information of each conversation content can be accurately expressed. In addition, even if two conversation contents have different texts, conversation content features corresponding to the conversation contents are the same or similar as long as context of the conversation contents are similar or meanings of the conversation contents are almost the same. Therefore, after service processing is performed based on the conversation content feature obtained in the above method, a more accurate service processing result can be obtained.

It should be further noted that, in the risk recognition field, potential semantic information in a voice of a user usually needs to be recognized precisely to effectively and actively prevent and control a risk. Therefore, the model training method provided in the present specification is particularly applicable to training a feature extraction model in the risk recognition field, which ensures that a trained feature extraction model can extract more accurate voice features, thereby implementing more accurate risk control, and ensuring data and property security of a user.

Therefore, in the model training method provided in the present specification, the obtained historical conversation can be a conversation generated between an intelligent customer service employee and a user when a risk control service is performed, or a conversation generated between a user and an intelligent customer service employee when the user encounters a service risk. Correspondingly, after the feature extraction model is applied to a risk recognition scenario, the conversation content feature extracted by the feature extraction model can be sent to a backend risk recognition model. The risk recognition model can determine, based on the received conversation content feature, a risk type of a risk encountered by a user, so that in a subsequent process, the risk recognition model performs active risk prevention and control based on a prevention and control policy corresponding to the risk type.

For example, when the user makes a conversation with the intelligent customer service employee, the server can collect and store conversation content. When a model training task is started, the server can obtain the conversation content as the historical conversation, and determine the target conversation content from the historical conversation in the manner provided above.

Further, the server can input the historical conversation into the feature extraction model to obtain the first feature and the second feature, and further train the feature extraction model based on the deviation between the first feature and the second feature.

In a subsequent implementation, the server can obtain conversation contents generated between the user and the intelligent customer service employee in a service processing process, and input these conversation contents into the trained feature extraction model to obtain, by using the feature extraction model, a conversation content feature corresponding to each conversation content. The server can send the conversation content features of these conversation contents to a receiving end for the receiving end to perform risk recognition on the user based on the conversation content features.

The model training method and the service processing method are described above in one or more implementations of the present specification. Based on a same idea, the present specification further provides a corresponding model training apparatus and service processing apparatus, as shown in FIG. 4 and FIG. 5.

Figure 4:
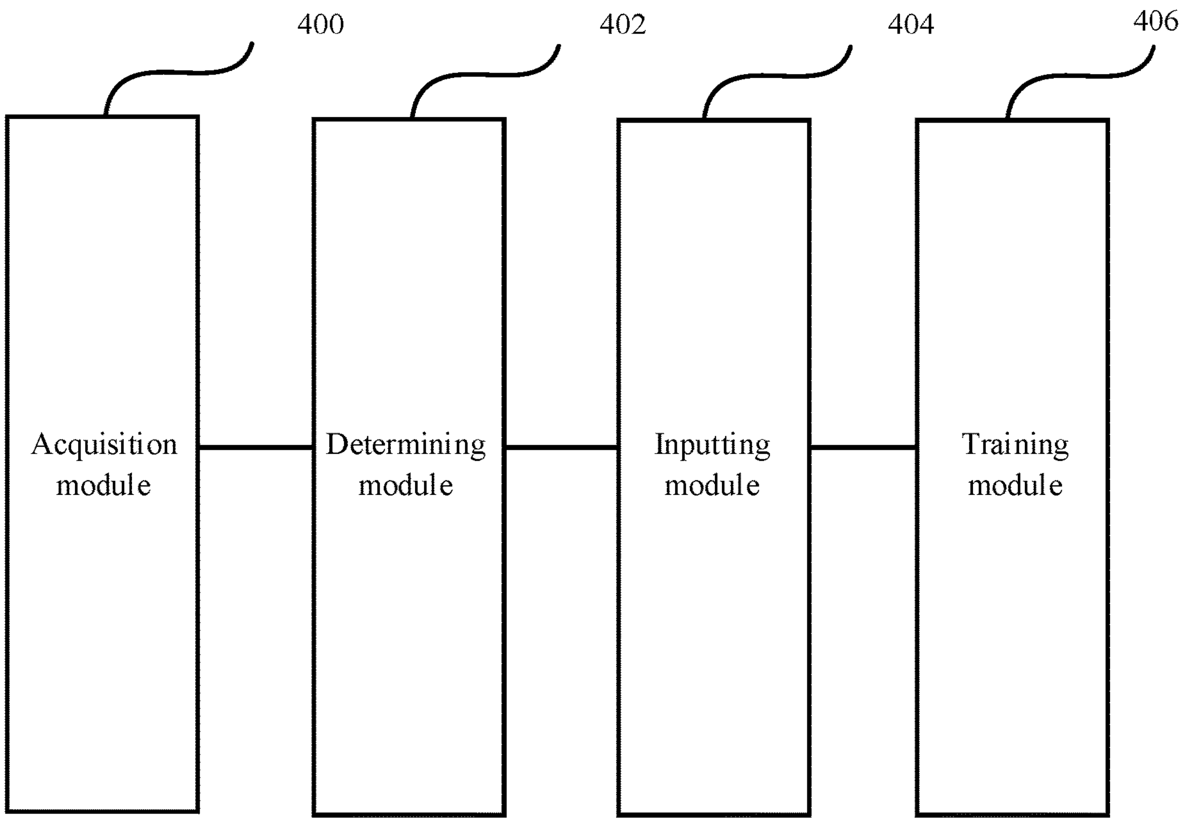
FIG. 4 is a schematic diagram illustrating a model training apparatus according to the present specification.
Figure 5:
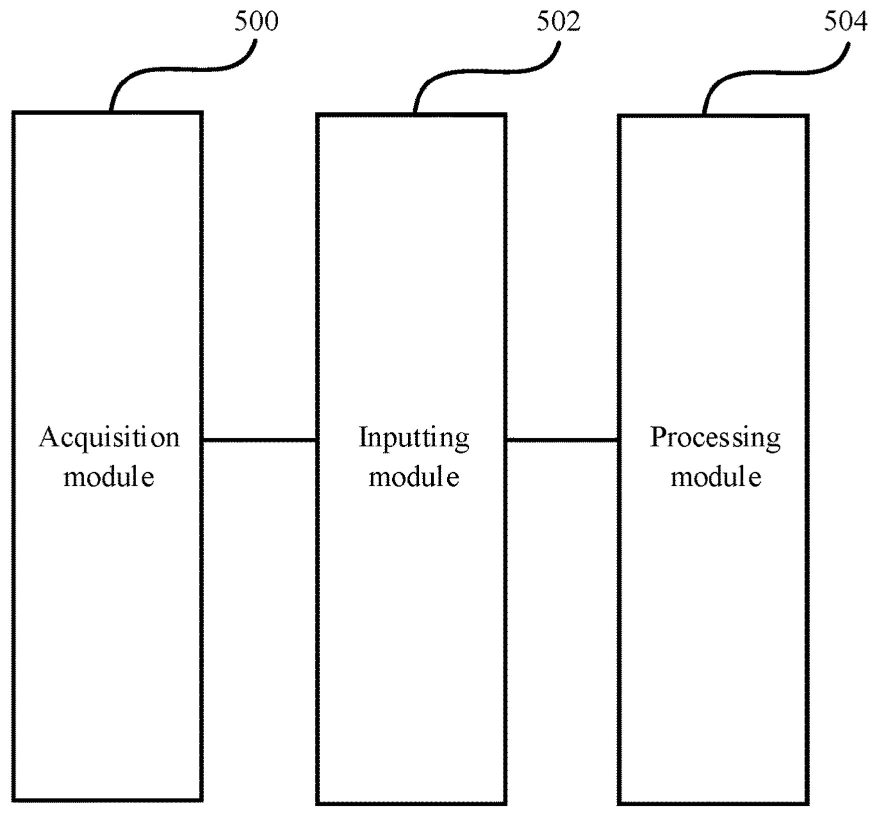
FIG. 5 is a schematic diagram illustrating a service processing apparatus according to the present specification.

FIG. 4 is a schematic diagram illustrating a model training apparatus according to the present specification, and the apparatus includes: an acquisition module 400, configured to obtain a historical conversation; a determining module 402, configured to determine a target conversation content from the historical conversation; an inputting module 404, configured to input the historical conversation into a to-be-trained feature extraction model for the feature extraction model to determine a conversation content feature corresponding to the target conversation content as a first feature based on a conversation content other than the target conversation content in the historical conversation, and to determine a conversation content feature corresponding to the target conversation content as a second feature based on the target conversation content; and a training module 406, configured to train the feature extraction model with a goal of reducing a deviation between the first feature and the second feature, where the trained feature extraction model is used to determine an output conversation content feature corresponding to each input conversation content, and send the output conversation content feature for a receiving end to perform service processing based on the received output conversation content feature.

In some implementations, before inputting the historical conversation into the feature extraction model, the inputting module 404 is further configured to replace the target conversation content in the historical conversation with an identified character to obtain a replaced conversation.

The inputting module 404 is, for example, configured to input the replaced conversation into the feature extraction model for the feature extraction model to determine a conversation content feature at a corresponding location of the identified character as the first feature based on a conversation content at a location other than the corresponding location of the identified character in the replaced conversation.

In some implementations, the determining module 402 is, for example, configured to select the target conversation content from the historical conversation based on a selection probability corresponding to each conversation content included in the historical conversation.

In some implementations, the determining module 402 is, for example, configured to: if it is determined that at least two target conversation contents need to be determined from the historical conversation, determine target conversation contents from conversation contents that are not adjacent to each other in a word order.

In some implementations, the training module 406 is, for example, configured to: determine a similarity between the first feature and the second feature, and train the feature extraction model with a goal of increasing, e.g., maximizing, the similarity.

In some implementations, before training the feature extraction model with the goal of reducing the deviation between the first feature and the second feature, the training module 406 is further configured to: input the replaced conversation into the feature extraction model, and restore, as a predicted conversation content, a conversation content at the corresponding location of a conversation content tag based on the conversation content at the location other than the corresponding location of the identified character in the replaced conversation.

The training module 406 is, for example, configured to train the feature extraction model with a goal of reducing the deviation between the first feature and the second feature and reducing a deviation between the prediction conversation content and the target conversation content.

FIG. 5 is a schematic diagram illustrating a service processing apparatus according to the present specification, and the apparatus includes: an acquisition module 500, configured to obtain a service conversation; an inputting module 502, configured to input the service conversation into a pretrained feature extraction model for the feature extraction model to determine, for each conversation content included in the service conversation, a conversation content feature corresponding to the conversation content based on a conversation content other than the conversation content in the service conversation, where the feature extraction model is obtained through training by using the above model training apparatus; and a processing module 504, configured to perform service processing based on the conversation content feature corresponding to each conversation content included in the service conversation.

The present specification further provides a computer-readable storage medium. The storage medium stores a computer program, and the computer program can be used to perform the model training method provided in FIG. 1 or FIG. 3.

Figure 6:
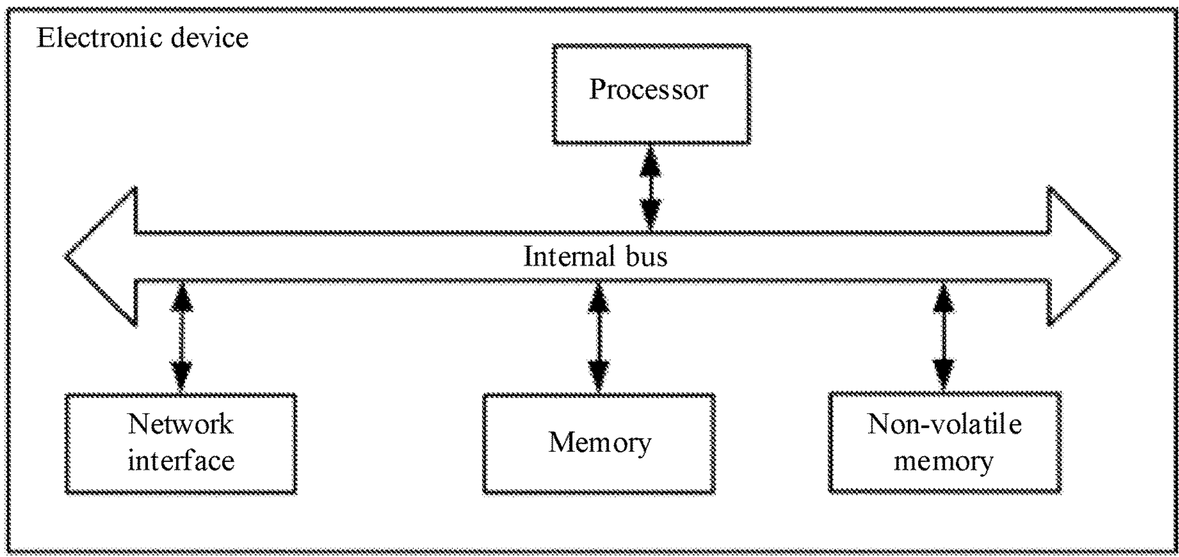
FIG. 6 is a schematic diagram illustrating an electronic device corresponding to FIG. 1 according to the present specification.

The present specification further provides a schematic diagram illustrating a structure of an electronic device corresponding to FIG. 1 or FIG. 3 shown in FIG. 6. As shown in FIG. 6, at a hardware layer, the electronic device includes a processor, an internal bus, a network interface, a memory, and a non-volatile memory, and certainly can further include hardware required by another service. The processor reads a corresponding computer program from the non-volatile memory to the memory and then runs the computer program, to implement the model training method described in FIG. 1 or FIG. 3. Certainly, in addition to a software implementation, the present specification does not exclude other implementations, such as a logic device or a combination of software and hardware. In other words, an execution entity of the following processing procedure is not limited to each logic unit, but can also be hardware or logic devices.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application specific integrated circuit chip. In addition, at present, instead of manually manufacturing an integrated circuit chip, this type of programming is mostly implemented by using "logic compiler" software. The software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several hardware description languages described above and is programmed into an integrated circuit.

A controller can be implemented in any suitable manner, for example, the controller can use a form such as a micro-processor, a processor, or a computer-readable medium, a logic gate, a switch, an application specific integrated circuit (ASIC), a programmable logic controller, or an embedded micro-controller storing computer-readable program code (such as software or firmware) that can be executed by the (micro)-processor. Examples of the controller include but are not limited to the following micro-controllers: ARC 625D, Atmel AT91SAM, Microchip PIC18F26K20, and Silicone Labs C8051F320. A controller of a memory can also be implemented as a part of control logic of the memory. A person skilled in the art also knows that, in addition to implementing the controller in a pure computer-readable program code manner, logic programming can absolutely be performed on method steps to enable the controller to implement the same function in a form of a logic gate, a switch, an application specific integrated circuit, a programmable logic controller, or an embedded micro-controller. Therefore, the controller can be considered as a hardware component, and an apparatus configured to implement various functions in the controller can also be considered as a structure in the hardware component. Alternatively, an apparatus configured to implement various functions can even be considered as both a software module implementing the method and a structure in the hardware component.

The systems, apparatuses, modules, or units described in the above implementations can be, for example, implemented by a computer chip or an entity, or can be implemented by a product having a certain function. A typical implementation device is a computer. For example, the computer can be a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the previous apparatus is described by dividing functions into various units. Certainly, when the present specification is implemented, functions of the units can be implemented in one or more pieces of software and/or hardware.

A person skilled in the art should understand that the implementations of the present specification can be provided as methods, systems, or computer program products. Therefore, the present specification can use a form of hardware only implementations, software only implementations, or implementations with a combination of software and hardware. Moreover, the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product according to the implementations of the present specification. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions can alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions can alternatively be loaded onto a computer or another programmable data processing device, so that a series of operations and steps are performed on the computer or the another programmable device to generate computer-implemented processing. Therefore, the instructions executed on the computer or the another programmable device provide steps for implementing a specific function in one or more procedures in the flowcharts and/or in one or more blocks in the block diagrams.

In a typical configuration, a computing device includes one or more processors (CPUs), input/output interfaces, network interfaces, and memories.

The memory can include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes permanent and non-permanent, removable and non-removable media, and can store information by using any method or technology. The information can be a computer-readable instruction, a data structure, a program module, or other data. Examples of a computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that a computing device can access. As described in the present specification, the computer-readable medium does not include transitory computer-readable media (transitory media) such as a modulated data signal and a carrier.

It should also be noted that the terms “include”, “comprise”, or their any other variants are intended to cover a non-exclusive inclusion, so a process, a method, a product, or a device that includes a list of elements not only includes those elements but also includes other elements that are not expressly listed, or further includes elements inherent to such process, method, product, or device. Without more constraints, an element limited by the conversation content “includes a . . . ” does not exclude the existence of additional identical elements in the process, method, product, or device that includes the element.

A person skilled in the art should understand that the implementations of the present specification can be provided as methods, systems, or computer program products. Therefore, the present specification can use a form of hardware only implementations, software only implementations, or implementations with a combination of software and hardware. Moreover, the present specification can use a form of a computer program product that is implemented on one or more computer-usable storage media (including but not limited to a disk memory, a CD-ROM, an optical memory, etc.) that include computer-usable program code.

The present specification can be described in the general context of computer-executable instructions executed by a computer, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In the distributed computing environments, the program module can be located in local and remote computer storage media including storage devices.

The implementations of the present specification are described in a progressive way. For same or similar parts of the implementations, mutual references can be made to the implementations. Each implementation focuses on a difference from the other implementations. In particular, for implementation of a system, because implementation of the system is basically similar to method implementation, description is relatively simple, and references can be made to parts of the method implementation descriptions.

The previous descriptions are merely implementations of the present specification and are not intended to limit the present specification. A person skilled in the art can make various modifications and variations to the present specification. Any modifications, equivalent replacements, and improvements made within the spirit and principle of the present specification shall fall within the scope of the present specification.

What is claimed is:

1. A model training method, comprising:

obtaining a historical conversation;

determining a target conversation content from the historical conversation;

inputting the historical conversation into a to-be-trained BERT feature extraction model for the BERT feature extraction model to automatically determine a first conversation content feature corresponding to the target conversation content based on a conversation content other than the target conversation content in the historical conversation, and to automatically determine a second conversation content feature corresponding to the target conversation content based on the target conversation content;

processing the first conversation content feature, by a first layer, to obtain a first feature;

processing the second conversation content feature, by a second layer to obtain a second feature; and training the BERT feature extraction model using the first feature and the second feature with a training goal of reducing a deviation between the first feature and the second feature, wherein the trained BERT feature extraction model is configured to determine an output conversation content feature corresponding to an input conversation content.

2. The method according to claim 1, further including: before the inputting the historical conversation into the feature extraction model, replacing the target conversation content in the historical conversation with an identified character to obtain a replaced conversation; and the inputting the historical conversation into the to-be-trained feature extraction model for the feature extraction model to determine the first conversation content feature corresponding to the target conversation content based on the conversation content other than the target conversation content in the historical conversation includes:

inputting the replaced conversation into the feature extraction model for the feature extraction model to determine a conversation content feature at a corresponding location of the identified character as the first conversation content feature based on a conversation content at a location other than the corresponding location of the identified character in the replaced conversation.

3. The method according to claim 1, wherein the determining the target conversation content from the historical conversation includes:

selecting the target conversation content from the historical conversation based on a selection probability corresponding to each conversation content included in the historical conversation.

4. The method according to claim 1, wherein the determining the target conversation content from the historical conversation includes:

determining target conversation contents from conversation contents that are not adjacent to each other in a word order.

5. The method according to claim 1, wherein the training the feature extraction model with the training goal of reducing the deviation between the first feature and the second feature includes:

determining a similarity between the first feature and the second feature; and training the feature extraction model with a training goal of increasing the similarity.

6. The method according to claim 2, further comprising: before the training the feature extraction model with the training goal of reducing the deviation between the first feature and the second feature, inputting the replaced conversation into the feature extraction model, and restoring, as a predicted conversation content, a conversation content at the corresponding location of the identified character based on the conversation content at the location other than the corresponding location of the identified character in the replaced conversation, wherein the training the feature extraction model with the training goal of reducing the deviation between the first feature and the second feature includes:

training the feature extraction model with a training goal of reducing the deviation between the first feature and the second feature and reducing a deviation between the predicted conversation content and the target conversation content.

7. The method according to claim 1, comprising:

obtaining a service conversation;

inputting the service conversation into the feature extraction model for the feature extraction model to determine, for a first service conversation content included in the service conversation, a first service conversation content feature corresponding to the first service conversation content based on a second service conversation content in the service conversation; and performing service processing based on the first service conversation content feature.

8. A non-transitory computer-readable storage medium having computer executable instructions stored thereon, the computer executable instructions, when executed by one or more processors, enabling the one or more processors to, individually or collectively, implement acts comprising:

obtaining a historical conversation;

determining a target conversation content from the historical conversation;

inputting the historical conversation into a to-be-trained BERT feature extraction model for the BERT feature extraction model to automatically determine a first conversation content feature corresponding to the target conversation content based on a conversation content other than the target conversation content in the historical conversation, and to automatically determine a second conversation content feature corresponding to the target conversation content based on the target conversation content;

processing the first conversation content feature, by a first laver, to obtain a first feature;

processing the second conversation content feature, by a second laver, to obtain a second feature; and training the BERT feature extraction model with a training goal of reducing a deviation between the first feature and the second feature, wherein the trained BERT feature extraction model is configured to determine an output conversation content feature corresponding to an input conversation content.

9. The non-transitory storage medium according to claim 8, wherein the acts further comprise: before the inputting the historical conversation into the feature extraction model, replacing the target conversation content in the historical conversation with an identified character to obtain a replaced conversation; and the inputting the historical conversation into the to-be-trained feature extraction model for the feature extraction model to determine the first conversation content feature corresponding to the target conversation content based on the conversation content other than the target conversation content in the historical conversation includes:

inputting the replaced conversation into the feature extraction model for the feature extraction model to determine a conversation content feature at a corresponding location of the identified character as the first conversation feature based on a conversation content at a location other than the corresponding location of the identified character in the replaced conversation.

10. The non-transitory storage medium according to claim 8, wherein the determining the target conversation content from the historical conversation includes:

selecting the target conversation content from the historical conversation based on a selection probability corresponding to each conversation content included in the historical conversation.

11. The non-transitory storage medium according to claim 8, wherein the determining the target conversation content from the historical conversation includes:

determining target conversation contents from conversation contents that are not adjacent to each other in a word order.

12. The non-transitory storage medium according to claim 8, wherein the training the feature extraction model with the training goal of reducing the deviation between the first feature and the second feature includes:

determining a similarity between the first feature and the second feature; and training the feature extraction model with a training goal of increasing the similarity.

13. The non-transitory storage medium according to claim 9, wherein the acts further comprise: before the training the feature extraction model with the training goal of reducing the deviation between the first feature and the second feature, inputting the replaced conversation into the feature extraction model, and restoring, as a predicted conversation content, a conversation content at the corresponding location of the identified character based on the conversation content at the location other than the corresponding location of the identified character in the replaced conversation, wherein the training the feature extraction model with the training goal of reducing the deviation between the first feature and the second feature includes:

training the feature extraction model with a training goal of reducing the deviation between the first feature and the second feature and reducing a deviation between the predicted conversation content and the target conversation content.

14. The non-transitory storage medium according to claim 8, wherein the acts further comprise:

obtaining a service conversation;

inputting the service conversation into the feature extraction model for the feature extraction model to determine, for a first service conversation content included in the service conversation, a first service conversation content feature corresponding to the first service conversation content based on a second service conversation content in the service conversation; and performing service processing based on the first service conversation content feature.

15. A computing system, comprising one or more memory devices and one or more processors, the one or more memory devices individually or collectively having computer executable instructions stored thereon, which when executed by the one or more processors, enable the one or more processors to, individually or collectively, implement acts including:

obtaining a historical conversation;

determining a target conversation content from the historical conversation;

inputting the historical conversation into a to-be-trained BERT feature extraction model for the BERT feature extraction model to determine a first conversation content feature corresponding to the target conversation content based on a conversation content other than the target conversation content in the historical conversation, and to determine a second conversation content feature corresponding to the target conversation content based on the target conversation content;

processing the first conversation content feature, by a first laver, to obtain a first feature;

processing the second conversation content feature, by a second laver, to obtain a second feature; and training the BERT feature extraction model with a training goal of reducing a deviation between the first feature and the second feature, wherein the trained BERT feature extraction model is configured to determine an output conversation content feature corresponding to an input conversation content.

16. The computing system according to claim 15, wherein the acts further comprise: before the inputting the historical conversation into the feature extraction model, replacing the target conversation content in the historical conversation with an identified character to obtain a replaced conversation; and the inputting the historical conversation into the to-be-trained feature extraction model for the feature extraction model to determine the first conversation content feature corresponding to the target conversation content based on the conversation content other than the target conversation content in the historical conversation includes:

inputting the replaced conversation into the feature extraction model for the feature extraction model to determine a conversation content feature at a corresponding location of the identified character as the first conversation feature based on a conversation content at a location other than the corresponding location of the identified character in the replaced conversation.

17. The computing system according to claim 15, wherein the determining the target conversation content from the historical conversation includes:

determining target conversation contents from conversation contents that are not adjacent to each other in a word order.

18. The computing system according to claim 15, wherein the training the feature extraction model with the training goal of reducing the deviation between the first feature and the second feature includes:

determining a similarity between the first feature and the second feature; and training the feature extraction model with a training goal of increasing the similarity.

19. The computing system according to claim 16, wherein the acts further comprise: before the training the feature extraction model with the training goal of reducing the deviation between the first feature and the second feature, inputting the replaced conversation into the feature extraction model, and restoring, as a predicted conversation content, a conversation content at the corresponding location of the identified character based on the conversation content at the location other than the corresponding location of the identified character in the replaced conversation, wherein the training the feature extraction model with the training goal of reducing the deviation between the first feature and the second feature includes:

training the feature extraction model with a training goal of reducing the deviation between the first feature and the second feature and reducing a deviation between the predicted conversation content and the target conversation content.

20. The computing system according to claim 15, wherein the acts further comprise:

obtaining a service conversation;

inputting the service conversation into the feature extraction model for the feature extraction model to determine, for a first service conversation content included in the service conversation, a first service conversation content feature corresponding to the first service conversation content based on a second service conversation content in the service conversation; and performing service processing based on the first service conversation content feature.

* * * * *